United States Patent [19]

Britten

[11] Patent Number: 4,688,738
[45] Date of Patent: Aug. 25, 1987

[54] COMBINATION FISHING REEL

[76] Inventor: Glenwood J. Britten, 4220 Oriole Dr., Jackson, Mich. 49202

[21] Appl. No.: 922,461

[22] Filed: Oct. 23, 1986

[51] Int. Cl.$^4$ .................... A01K 89/015; A01K 89/04
[52] U.S. Cl. .................... 242/84.2 B; 242/84.1 J; 242/84.21 R
[58] Field of Search .................... 242/84.1 J, 84.2 B, 242/84.21 R

[56] References Cited

U.S. PATENT DOCUMENTS

| 744,454 | 11/1903 | Allen | 242/84.2 B |
|---|---|---|---|
| 2,083,689 | 6/1937 | Clifford | 242/84.2 B |
| 2,559,215 | 7/1951 | Funk | 242/84.2 B |
| 2,580,777 | 1/1952 | Hewlett | 242/84.2 B |
| 2,613,046 | 10/1952 | Redding | 242/84.2 B |
| 2,634,920 | 4/1953 | Dunn | 242/84.2 B |
| 2,708,077 | 5/1955 | Dalzell et al. | 242/84.2 B |
| 3,004,731 | 10/1961 | Mauborgne | 242/84.2 B |
| 3,350,029 | 10/1967 | Isbell | 242/84.2 B |
| 3,425,643 | 2/1969 | Lemon | 242/84.2 B |
| 4,216,921 | 8/1980 | Puryear | 242/84.2 R |

FOREIGN PATENT DOCUMENTS 1159209 12/1963 Fed. Rep. of Germany .
756207 8/1956 United Kingdom ............ 242/84.1 J Primary Examiner—Billy S. Taylor
Attorney, Agent, or Firm—Beaman & Beaman

[57] ABSTRACT

A combination fishing reel wherein fish line is retrieved and wound upon a spool rotating about its normal axis and is cast from the spool in a spinning manner over the nonrotating spool open end. Line twisting is eliminated by simultaneously rotating the spool about an axis transverse to its normal axis of rotation during line retrieval, and by utilizing different rates of spool rotation about its two axes of movement during line retrieval automatic level crisscross winding of the line on the spool is achieved, successive windings being circumferentially spaced to minimize line binding and wedging and eliminate line entanglement during casting. Automatic indexing means orient the spool to its supporting housing for casting, and a bail may be used to augment line handling during retrieval.

9 Claims, 9 Drawing Figures

COMBINATION FISHING REEL

BACKGROUND OF THE INVENTION

Fishing reels of the spinning type have enjoyed popularity due to the low resistance to dispensing of the line from the spool. In a spinning reel, the fishing line is dispensed axially from the spool over an open spool end and no revolving of the spool about its axis is required. As the reel utilizes no moving parts during casting, maximum distances may be cast with a minimum of skill.

An inherent problem with fishing reels of the spinning type is that a twist is imparted to the line for each wound coil as the line is dispensed, and this twist may remain in the line during retrieval and often results in entanglements and line knotting creating severe problems for the fisherman.

During line retrieval in a spinning reel, the spool is normally nonrotating and a line holder orbits about the spool winding the line thereon. The spool may axially oscillate to encourage line leveling, but as adjacent coils of line are aid upon substantially parallel coils therebelow, the line will often wedge between spooled coils during casting which may cause entanglement or interfere with the free dispensing of the line from the spool. Additionally, conventional spinning reels require line holders which impose significant wear upon the line during retrieval reducing the effective life of the line and gradually reducing the effective life of the line and gradually reducing the tension strength thereof.

It is an object of the invention to provide a fishing reel which has most of the advantages and few of the disadvantages of conventional spinning, spin casting and bait casting reels.

Another object of the invention is to provide a fishing reel of the spinning type wherein line twisting and line twist is eliminated.

A further object of the invention is to provide a fishing reel having a combined mode of operation wherein retrieval of the fishing line is upon a rotating spool while dispensing of the line is from a nonrotating spool in a spinning mode.

Yet another object of the invention is to provide a fishing reel capable of dispensing line in a spinning mode wherein line twist is eliminated, and during retrieval of the line, the line is deposited on the spool in a crisscross manner automatically providing level winding free of line wedging during casting.

An additional object of the invention is to provide a fishing reel utilizing a rotating spool during retrieval simultaneously rotating about two axes to eliminate line twist, and wherein dispensing of the line from the spool during casting is in a nonrotating spool spinning mode.

A further object of the invention is to provide a fishing reel capable of winding a fishing line upon a spool with an automatic level wind and crisscross depositing of the line upon previously coiled layers wherein no line engaging orientation devices are required at the spool which would cause the line to wear.

An additional object of the invention is to provide a fishing reel selectively positionable on the fishing rod between line retrieval and line casting positions wherein the spool rotates about its normal axis during retrieval and is nonrotative during casting which is in a spinning mode, and automatic indexing means are utilized to properly orient the spool to its support structure during casting.

In the practice of the invention a housing is pivotally mounted upon support structure of a conventional nature which is attached to the fish rod reel mounting surface. The housing is pivotally mounted to its support for rotation about an axis perpendicular to the length of the associated rod, and a thumb-engaging handle defined on the housing permits the housing and reel structure to be pivoted from a line-retrieving position to a line-casting position. A spring biases the housing toward the line-retrieval position.

A crank is rotatably mounted upon the housing and a shaft rotatably mounted in the housing is geared to the crank for rotation thereby. The axis of the shaft is perpendicular to the housing pivot axis, and when the reel is in its line-retrieval position the shaft length will be generally oriented in the direction of the associated rod.

The outer end of the shaft extends from the housing and includes an extension of a generally axial orientation upon which a fishing line spool having an open end is mounted about an axis which is perpendicular to the shaft axis. A gear concentric to the spool axis meshes with a intermediary gear located upon the shaft extension, which, in turn, meshes with a gear fixed to the housing and concentric to the shaft. Thus, upon rotation of the shaft about its axis the spool will be simultaneously rotated about the shaft axis and its own axis of rotation which is perpendicular to the shaft axis.

The simultaneous rotation of the spool about two axes perpendicularly disposed to each other during line retrieval will eliminate the line twist produced in the line during the casting in the spinning mode.

During line retrieval as the line is wound upon the spool, the gearing interconnecting the spool to the housing is of such ratio that the rate of rotation of the spool about its normal axis of rotation is slightly different than the rate of rotation of the shaft. This difference in the rates of rotation of the spool about its normal axis of rotation and that of the shaft causes the line to be wound on the spool such that successive line coils will be circumferentially spaced upon the inner coils on which they are wound, and will be in a nonparallel relationship thereto. Also, during line retrieval the line extends across the spool width producing a crisscross diagonal line pattern on the spool, and this crisscross winding automatically produces leveling of the line on the spool, and as successively wound layers of the line are not parallel to each other, but are obliquely related, line wedging is eliminated and during casting the line will be freely dispensed from the spool insuring maximum casting distance.

During casting, the housing, and associated reel structure, are pivoted approximately 90° from the position of the reel structure during line retrieval, and the spool will be located at a greater distance from the reel than during retrieval. This change of orientation of the spool with respect to the rod is of advantage in that locating the spool close to the rod during line retrieval provides the best control when landing fish, while locating the spool further from the rod during spin casting reduces "line slap" on the rod, which wears the line and reduces casting distance.

When it is desired to cast, the housing is pivoted by means of its thumb handle, and the crank is rotated in the direction opposite to that used during line retrieval. An indexing device mounted upon the inner end of the shaft within the housing engages a plunger mounted on the housing which will prevent further reverse rotation of the shaft when the spool is properly oriented to the housing and rod for casting in the spinning mode, i.e. the open end of the spool is disposed in the direction of the rod length and line guides. During casting, the spool is stationary, and due to the level crisscross wind of the line on the spool the line is dispensed over the spool open end with minimal resistance to achieve a maximum casting distance. Release of the thumb pressure on the thumb handle permits the housing, and associated reel structure, to pivot under the influence of a spring force to the line retrieval position and winding of the crank in the line retrieval direction will rotate the shaft to rotate the spool about its dual axes and wind the line thereon.

In an embodiment of the invention, a bail is included in the reel structure having a curved portion adapted to be disposed adjacent the spool during retrieval to aid in the control of the line. While the use of the bail is not necessary, some fishermen may prefer its use with the apparatus of the invention. The bail includes an inner end which is rotatably associated with the shaft, and the outer end of the bail is rotatably mounted upon the extension in substantial alignment with the shaft axis. A hub mounted upon the bail inner end is selectively engagable by reciprocal pins mounted on the housing, and engagement of a pin and hub orients the hub relative to a locking pin which prevents relative rotation between the bail and housing. This locking of the bail with respect to the housing will maintain the bail in the desired location during casting and also permits the bail to properly orient the spool for casting.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
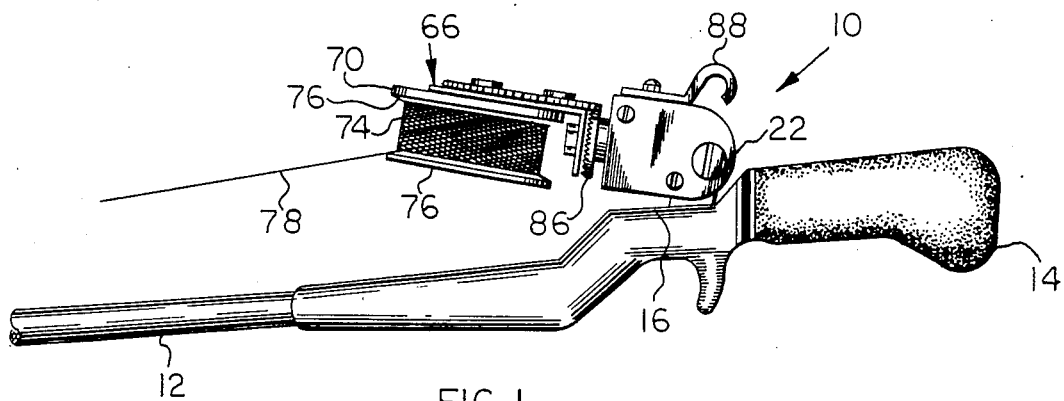
FIG. 1 is an elevational side view of fishing reel apparatus in accord with the invention as mounted upon a rod and illustrating the reel in the line retrieval position.
Figure 2:
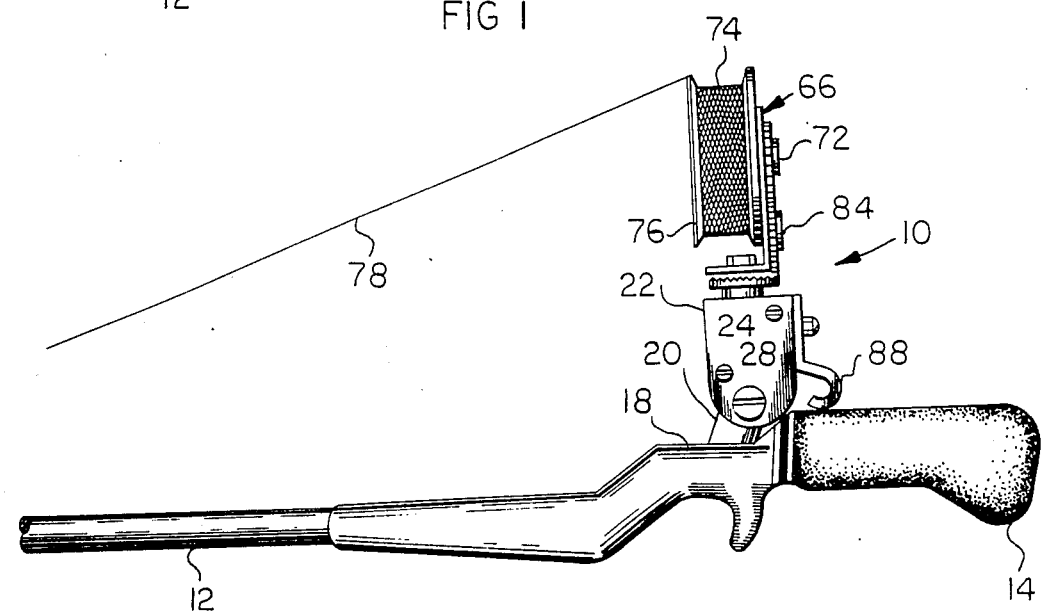
FIG. 2 is a side, elevational view similar to FIG. 1 illustrating the reel in the casting position and spinning mode.
Figure 9:
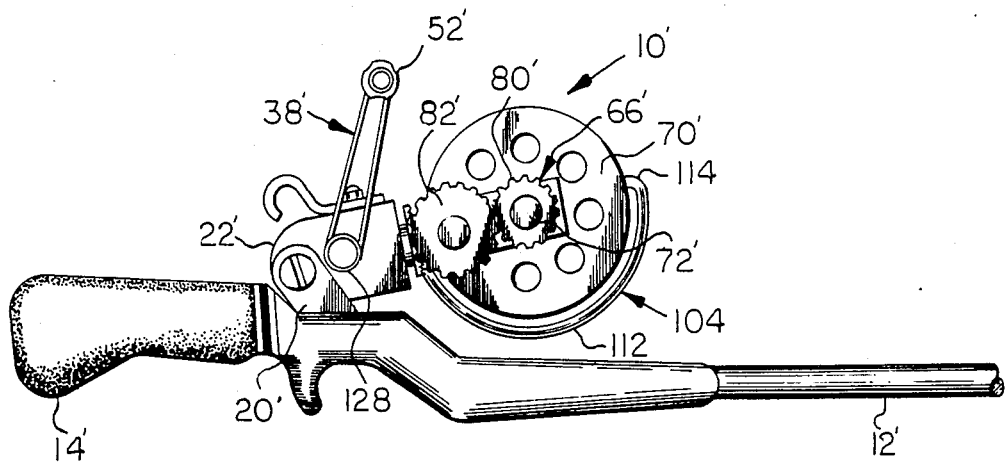
FIG. 9 is a side, elevational view of the embodiment of FIGS. 6–8 as taken from the crank handle side of the housing.

FIGS. 1 and 2 illustrate the two operative positions of a fishing reel 10 in accord with the inventive concepts. The reel 10 is mounted upo the fishing rod 12 having the usual handle 14, and the rod extends to the left having the usual line guides, not shown, mounted thereon. The fishing rod includes a reel mounting surface 16 of standard configuration, and reel apparatus in accord with the invention utilizes conventional reel mounting structure for mounting the reel upon the rod, and the particular construction of the type of rod mount used comprises no part of the instant invention. In the described embodiments the rod mounting apparatus consists of an elongated bracket 18 which extends in the general length of the rod and has a portion 20 upwardly extending, as shown in FIG. 9, to which the reel housing is mounted. The plate 18 is bolted to the surface 16 by screws or bolts, not shown.

Figure 7:
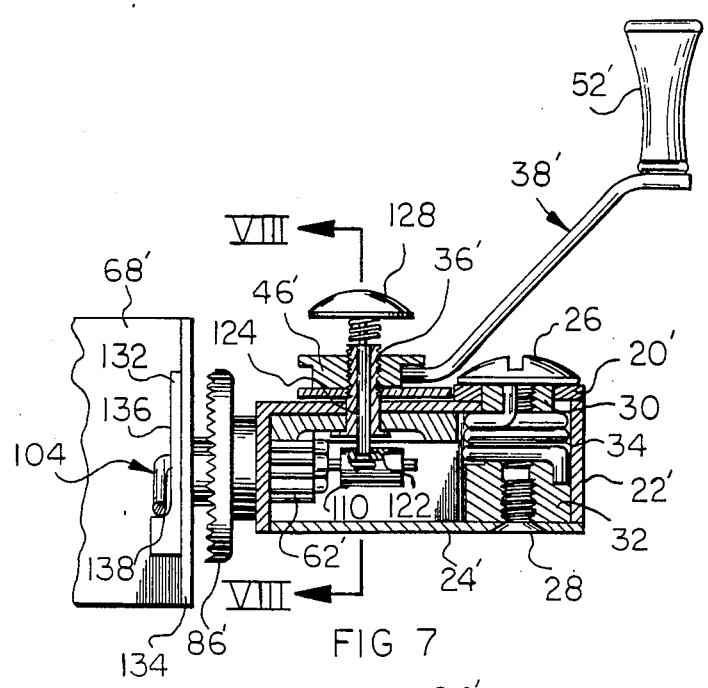
FIG. 7 is a sectional view through the embodiment of FIG. 6 as taken along Section VII—VII thereof.
Figure 8:
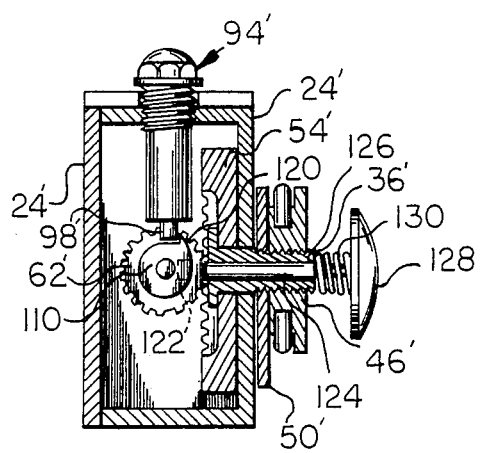
FIG. 8 is an elevational, sectional view taken along Section VIII—VIII of FIG. 7.

The reel 10 includes a housing 22 having parallel sides 24, FIG. 7, and the housing is pivotally mounted upon the rod 12 by the bracket 18. The structure for pivotally mounting the housing upon the bracket 18 is best shown in FIG. 7 and includes screws 26 and 28 which define a pivot axis. The screws are threaded into bushings 30 and 32 located within the housing. Bushing 32 is fixed to the housing 22, while bushing 30 is affixed to the bracket portion 20, and a torsion spring 34 interposed between the bushings biases the housing in a countarclockwise direction as viewed in FIGS. 1 and 2.

Figure 5:
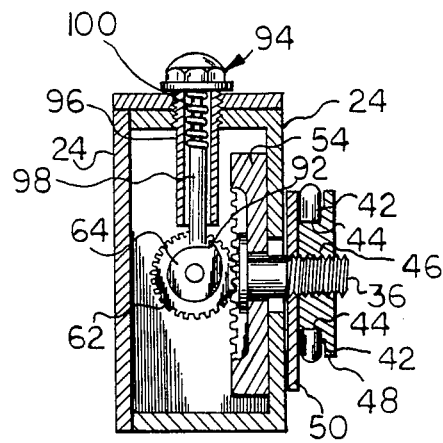
FIG. 5 is an elevational, sectional view taken through the housing along Section V—V of FIG. 4.

As will be appreciated from FIG. 5, a shaft 36 is rotatably mounted within one side of the housing 22, and a crank handle 38 is mounted on the crankshaft 36 for manual rotation of the shaft. Preferably, the crank handle 38 is pivotally mounted with respect to the shaft 36 and takes the form shown in FIG. 9 wherein a pair of wire crank portions 40 are bent inwardly at their inner ends 42 and received in diametrically opposed holes 44, FIG. 5, defined in the hub 46 fixed to the shaft 36. A plate 48 defined on the hub located over the wire element ends 42 and spaced from the plate 50 will normally maintain the crank 38 in the position shown in FIGS. 5, 7 and 9. However, by pivoting the crank 38 about the ends 42 the plate 48 will "cam" the portions 40 outwardly around plate 48 permitting the crank handle 38 to pivot about its ends 42 into a folded position wherein the crank knob 52 will be located adjacent the reel structure in a storage condition.

Internally, the crankshaft 36 is connected to a gear 54 having teeth 56.

Figure 4:
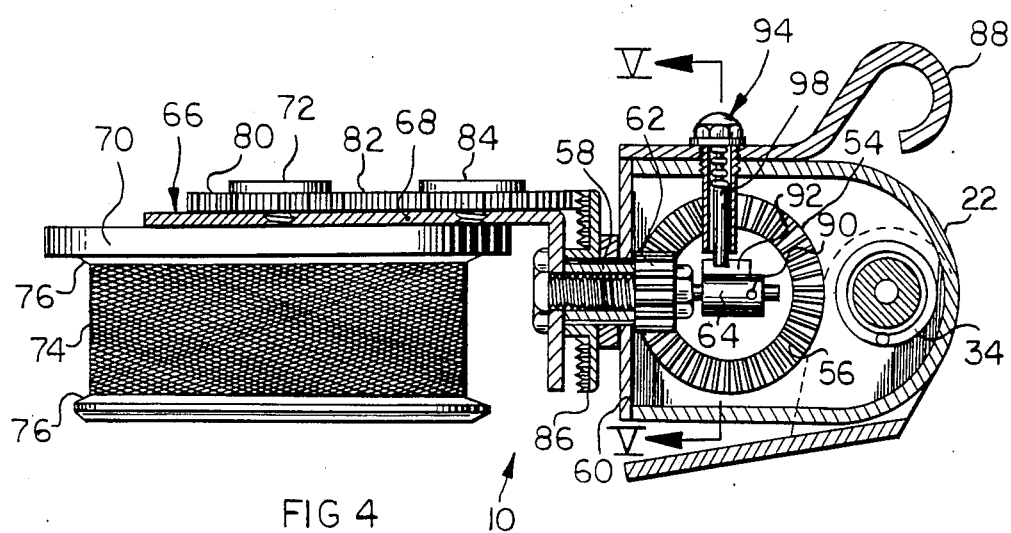
FIG. 4 is a side, elevational, sectional view taken along Section IV—IV of FIG. 3.

A shaft 58, FIG. 4, is rotatably mounted within the housing wall 60, and includes an inner end upon which a gear 62 is mounted having teeth which mesh with the crank gear teeth 56. The innermost end of the shaft 58 is of a reduced dimension and includes an index cam 64 attached thereto for a purpose later described. The outer end of the shaft 58 extends from the housing and an L-shaped bracket 66 is affixed thereto for rotation with the shaft. The bracket 66 includes an extension 68 which is slightly offset from the axis of the shaft 58, but is substantially parallel thereto.

A circular dish-like spool guide 70 is fixed to the inner side of the bracket extension 68, and a spool shaft 72 is rotatably mounted within the extension and spool guide which has an axis substantially perpendicular to the axis of the shaft 58. A fishing line spool 74 is attached to the shaft 72, and the spool 74 includes side flanges 76 between which the fishing line 78 may be wound.

Figure 3:
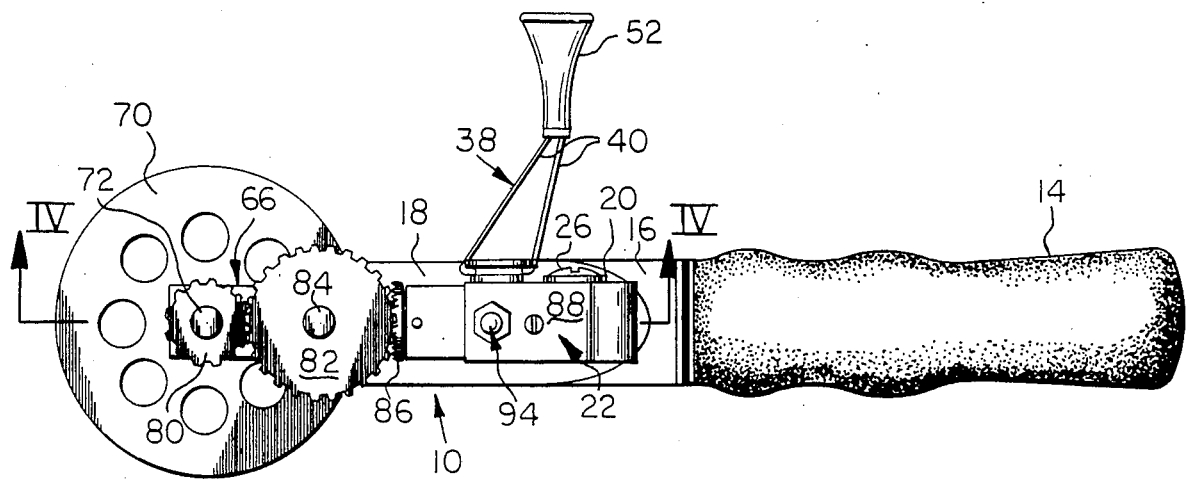
FIG. 3 is a top view of FIG. 1 illustrating the shaft extension, spool and spool gearing.

A spur gear 80 is attached to the spool shaft 72 adjacent the outer side of the bracket extension 68, FIG. 3, and an intermediary idler gear 82 is rotatably attached to the extension 68 for rotation about the axle stub 84. The teeth of gear 80 mesh with the teeth of gear 82.

A gear 86 is mounted on the housing 22 and is stationarily fixed with respect to the housing concentric with the axis of the shaft 58. The gear 86 includes teeth which mesh with those of gear 82 and it will be appreciated that rotation of the shaft 58 by the crank 38 will cause the spool 74 to rotate about the axis of the shaft 58, and simultaneously, this rotation of the shaft 58 will also cause the spool to rotate about its normal axis of rotation as defined by the shaft 72 due to the engagement of the teeth of the gears 80, 82 and 86.

In the practice of the inventive concepts the number of teeth of gears 80 and 86 differ by at least one integer as the rate of rotation of the spool 74 about the axis of shaft 58 must differ from the rate of rotation of the spool 74 about its normal rotative axis as defined by shaft 72. This difference in the relative rates of rotation about the two axes of rotation to which the spool is subjected causes the fishing line 78 to wind upon the spool during retrieval in a crisscross direction wherein successive coils are slightly spaced from each other in a circumferential direction, and, as described later, the winding of the line on the spool produces an automatic leveling of the line in a nonbinding manner.

The housing 22 is provided with a thumb handle 88, FIGS. 1 and 2, whereby the reel structure can be pivoted from the line retrieving position shown in FIG. 1 to the casting position shown in FIG. 2. Depressing of the thumb handle 88 as shown in FIG. 1 causes the reel structure to pivot to the position shown in FIG. 2. This clockwise pivoting is against the torsion force produced on the housing 22 by the torsion spring 34, and upon release of the thumb pressure on the handle 88 the reel will pivot from the position of FIG. 2 to that of FIG. 1 because of the spring force.

Retrieval of the line 78 takes place with the fishing reel apparatus in the position of FIG. 1. In this mode the spool 74 is located relatively close to the rod 12 and the axis of the spool shaft 72 is oblique to the length of the line 78 as it approaches the spool. For best results the angle of the spool to the approaching fish line should be such that the line extends across the spool between side flanges 76 as the line is wound upon the spool, and the fisherman will rotate the crank 38 in a clockwise direction, as viewed in FIG. 9, to rotate the gears 54 and 62, the shaft 58, the extension 68 and the spool 74. The simultaneous rotation of the spool 74 about the axes of the shaft 58 and the shaft 72 produces several results. Rotation of the spool about the axis of shaft 58 will take the twist out of the line 78 which occurred during the spinning dispensing of the line during casting. Additionally, this rotation will vary the angle of the line 78 with respect to the spool 74 as the line is retrieved causing the line to move back and forth between side flange 76 which produces an automatic level wind in a crisscross pattern which prevents line wedging. The simultaneous rotation of the spool about its shaft 72 will wind the line upon the spool, and as the rates of rotation of the spool about its two axes of rotation differ, the line is deposited on the spool in a uniform manner wherein consecutive coils are offset from each other in a circumferential direction and an optimum "laying" of the line on the spool is achieved which eliminates line twist and prevents the line from binding with adjacent spooled coils.

When it is desired to cast, the fisherman depresses the thumb handle 88 to pivot the housing 22 and associated reel structure to the position of FIG. 2 wherein the open end of the spool is disposed in the general direction of the rod line guides, not shown. As the cast is made, the line passes over the open end of the nonrotating spool 74 in the known manner, and due to the crisscross winding of the line on the spool and the uniform level of the line, uniform dispensing occurs in the spinning mode of the reel without the line binding or entangling.

Of course, during casting, it is necessary that the open end of the spool be properly oriented to the rod 12, and this orientation is assured by the utilization of the indexing cam 64 located on the inner end of the shaft 58 within the housing 22. The indexing cam 64 is fixed to the shaft inner end by a set screw 90, and the cam has a configuration which will be appreciated from FIG. 5. The outer configuration of the cam 64 is of a spiral form and includes an abrupt abutment shoulder 92. A detent 94 is mounted within the housing 22 and includes a guide sleeve 96 radially disposed with respect to the shaft 58. Within the guide sleeve a plunger 98 is mounted which is biased inwardly by the light compression spring 100 wherein the inner end of the plunger 98 always engages the surface of the cam 64. The spring imposes a light biasing action, and during rotation of the shaft 58 during retrieval of the line, the inner end of the plunger 98 rides on the periphery of the cam and drops over the shoulder 92 during each clockwise rotation of the cam, FIG. 5, and the shaft 58 freely rotates in the clockwise direction.

However, when it is desired to cast, the direction of rotation of the crank 38 is reversed which rotates the shaft 58, and the index cam 64 in the counterclockwise direction, FIG. 5. This counterclockwise direction of rotation of the cam permits the plunger 98 to pass along the periphery of the cam until the abutment shoulder 92 engages the plunger, and further rotation of the index cam 64, shaft 58 and crank 38 is prevented. The cam 64 is so positioned upon the shaft 58 that engagement of the abutment shoulder with the plunger occurs when the open end of the spool 74 is properly oriented to the rod 12 for casting, i.e. the spool shaft 72 is approximately parallel to the rod length and the open end of the spool is disposed toward the rod line guides, not shown. As this orientation of the spool 74 to permit the spinning casting mode is automatically accomplished by merely reversing the direction of rotation of the crank 38, cycling of the fishing reel between the retrieval mode of FIG. 1 and the casting mode of FIG. 2 is easily achieved.

While a fishing reel in accord with the invention may be readily used by a fisherman of ordinary skill without a bail disposed adjacent the spool, some fisherman desire that a bail be used with a spinning type reel to aid in control and confinement of the spooled line, and the embodiment of FIGS. 6-9 illustrates the use of a bail in accord with a reel embodying the inventive concepts. In these figures components identical to those previously described are indicated by primed reference numerals.

Figure 6:
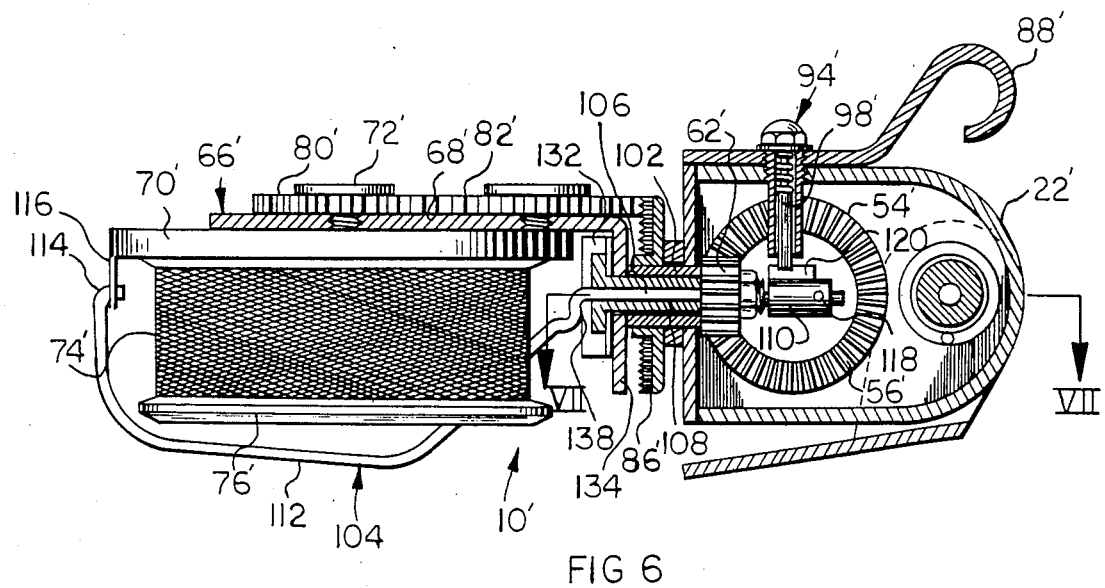
FIG. 6 is an elevational, sectional view similar to FIG. 4 of an embodiment of the invention utilizing a bail.

With reference to FIG. 6, the shaft 102 is of a tubular construction, and the bail, generally indicated at 104, includes an inner end 106 which is rotatably mounted within the shaft bore 108. The innermost end of the bail end 106 extends from the inner end of the shaft 102 and has a hub 110 affixed thereto, as later described.

The bail 104 includes a central region 112 of a curved configuration which is of a form to conform to the outer periphery of a portion of the spool 74', as known, and the outermost end 114 of the bail is mounted within a hole in the bracket 116 attached to the spool guide 70'. The outer end 114 of the bail is in alignment with the axes of the shaft 102. In this manner the bail 104 may be pivoted to a position wherein the central region 112 is disposed adjacent the spool periphery, or the bail may be pivoted away from the spool periphery as is the case during spinning casting.

The hub 110 is fixed to the inner end of the bail by a set screw 118, and is of a configuration similar to the index cam 64 and includes abutment shoulder 120 and also includes a radial hole 122 which is in alignment with the center of the crankshaft 36'. As will be appreciated from FIG. 8, a pin 124 is reciprocally mounted within the bore 126 formed in the crankshaft 36' for axial displacement therein, and the pin includes an exteriorly accessible button end 128. A compression spring 130 interposed between the button end 128 and the end of the crankshaft 36' biases the pin 124 outwardly, to the right, FIG. 8, and the inner end of pin 124 may be slightly enlarged to retain the pin in bore 126. Upon the bail being located in a predetermined rotative position within the shaft 102, the hub hole 122 will align with the pin 124 and depressing of the button 128 will cause the pin to enter the hole 122 and lock the hub 110 and bail 104 against rotative movement with respect to the housing 22'.

A bail guide and stop 132 is affixed to the bracket portion 134 concentric to the axis of the shaft 102, and the bail frictionally engages the surface 136 of the guide, and the abutment shoulder 138 will engage the bail when the bail is rendered nonrotative due to reception of the pin 124 in the hole 122 and the crank 38' is rotated in a clockwise direction. When the crank 38' is rotated in the counterclockwise direction the bail will engage the extension 68' adjacent the guide 132 and position the open end of the reel for casting.

The housing 22' includes a detent 94' having a plunger 98' which engages the abutment shoulder 120 when the crank 38' is rotated counterclockwise, and when the plunger and shoulder are engaged the hole 122 is aligned with the pin 124. Thus, in the embodiment of FIGS. 6-9, the plunger 98' is used to align the bail hub 110 with the pin 124 to fix the bail relative to the housing and the bail is used to limit rotation of the housing 22' for indexing purposes.

Upon the fisherman releasing pressure upon the button end 128 of the pin 124 the bail 104 may freely rotate with respect to the shaft 102 within the limits of its rotation, and be manually positioned as desired with respect to the spool during the line-retrieval and line-casting modes, and the frictional engagement of the bail with the guide surface 136 will keep the bail in the manually adjusted position.

It will therefore be appreciated that fishing reel apparatus constructed in accord with the invention provides the advantages of a spinning reel, yet eliminates the disadvantage of spinning reels with respect to line twisting. The dual rotation of the spool during line retrieval eliminates line twist. As no line-engaging level wind mechanism is necessary to achieve automatic line leveling on the spool, and as the line winds on the spool in a crisscross manner wherein sequential coils are circumferentially spaced from each other due to the difference in the rate of rotation of the spool about its two axes of rotation, line wear and line binding is minimized. This type of fishing reel is of a great advantage when used with very light line highly susceptible to wear. The positioning of the spool adjacent the rod during lins retrieval, and further from the rod during casting, provides advantages as described above, and the reel allows unusually advantageous line control an feathering for achieving greater accuracy during casting. The automatic positioning of the spool with respect to the casting mode merely by reversing the direction of the crank rotation simplifies operation, and while the mechanical movements of the spool are more complex than conventional fishing reel structure, the components of the reel may be manufactured relatively economically.

It is appreciated that various modifications to the inventive concepts may be apparent to those skilled in the art without departing from the spirit and scope of the invention.

I claim:

1. A fishing reel characterized by its ability to evenly wind a fishing line upon a spool to produce a uniform level distribution of the line on the spool and eliminate line twist comprising, in combination, a housing, fishing rod attachment means defined upon said housing, a shaft having a first axis rotatably mounted upon said housing, said shaft having an inner end and an outer end, a crank means rotatably mounted on said housing operatively connected to said shaft for rotating said shaft about said first axis, an extension defined on said shaft outer end extending in the longitudinal direction of the length of said shaft, a second shaft mounted on said extension defining a second axis substantially perpendicular to said first axis, a spool mounted on said second shaft for rotation about said second axis, a first stationary gear concentrically related to said first shaft, a second gear concentrically relatd to said second shaft and operatively connected to said spool whereby rotation of said second gear rotates said spool, third gear means rotatably mounted on said shaft extension meshing with said first and second gears whereby rotation of said first shaft simultaneously rotates said spool and second shaft about said first axis and rotates said spool about said second axis, the ratios between the number of teeth of said first and second gears being such that the rate of rotation of said spool about said first axis differs from the rate of rotation of said spool about said second axis whereby successive coils of line being wound on said spool will be spaced from each other in the circumferential direction of said spool.

2. In a fishing reel as in claim 1, said third gear means comprising a third gear rotatably mounted on said shaft extension directly meshing with said first and second gears, the number of teeth of said first gear differing from the number of teeth of said second gear by at least one.

3. A combination fishing reel capable of dispensing fish line from a non-revolving spool in a spinning mode and retrieving the line upon the spool while revolving in a manner to eliminate line twist comprising, in combination, a housing, an elongatad pole mount connected to said housing having a length adapted to extend in the direction of the length of a fish pole, pivot means pivotally mounting said housing upon said pole mount for pivotal movement about a first axis substantially perpendicular to the length of said pole mount between line-casting and line-retrieval positions, a shaft rotatably mounted upon said housing rotatable about a second axis substantially perpendicular to said first axis, said shaft having an inner end within said housing and an outer end extending from said housing, a first gear mounted on said shaft inner end, a crank rotatably mounted upon said housing, a second gear mounted on said crank meshing with said first gear whereby rotation of said crank rotates said shaft about said second axis, a spool rotatably mounted on said shaft outer end rotatable about a third axis substantially perpendicular to said second axis, said spool having an open end whereby fish line coiled thereon may be dispensed from said spool by a spinning action over said open end, gear drive means operatively connecting said spool to a gear fixed relative to said housing whereby rotation of said shaft and spool about said second axis simultaneously rotates said spool about said third axis at a rate of rotation different than the rate of rotation of said shaft, a spring biasing said housing toward said lineretrieval position, the length of said shaft extending in the general direction of the length of said pole mount when said housing is in said line-retrieval position and said spool open end selectvely extending in the general direction of the length of said pole mount when said housing is in said linecasting position.

4. In a combination fishing reel as in claim 3, a thumb handle defined on said housing for pivoting said housing between said line-retrieval and line-casting positions.

5. In a combination fishing reel as in claim 3, said crank shaft being rotatable in a line-retrieval direction to wind fish line upon said spool and a reverse direction, index means mounted upon said shaft inner end within said housing rotating with said shaft about said second axis, a detent mounted on said housing selectively engaging said index means at a predetermined rotative position of said shaft when said crank and shaft are rotated in a reverse direction to rotatable orient said shaft relative to said housing such that said spool open end will extend in the general direction of the length of said pole mount when said housing is in said line-casting position.

6. In a combination fishing reel as in claim 5, said index means comprising a cam mounted on said shaft having an abutment shoulder and said detent comprises an elongated plunger reciprocally mounted on said housing, a spring biasing said plunger into engagement with said cam, said abutment shoulder engaging said plunger at said shaft predetermined rotative position to prevent further rotation of said crank and shaft in said reverse direction.

7. In a combination fishing reel as in claim 3, said shaft being tubular, a bail having an inner end rotatably mounted within said shaft and extending into said housing, a curved central region selectively located adjacent the periphery of said spool and an outer end rotatably affixed to said shaft outer end in substantial alignment with said second axis, and releasable keying means interposed between said bail inner end and said housing to selectively prevent relative rotation between said housing and said bail inner end.

8. In a combination fishing reel as in claim 7, said keying means comprising a hub affixed to said bail inner end having a radial opening defined therein and a reciprocal pin mounted upon said housing selectively receivable within said opening.

9. In a combination fishing reel as in claim 3, a crankshaft rotatably mounted upon said housing, said crank being pivotally mounted upon said crankshaft for pivotal movement between an operative cranking position and a folded storage position.

* * * * *